United States Patent
Sakaguchi et al.

[11] Patent Number: 5,158,508
[45] Date of Patent: Oct. 27, 1992

[54] RESILIENT SUPPORT FOR FRICTION ELEMENTS OF A MULTI-DISC CLUTCH OR BRAKE OF AN AUTOMATIC TRANSMISSION

[75] Inventors: Yoshikazu Sakaguchi, Anjo; Takahiro Yasuda, Toyota; Yasushi Ando, Okazaki; Masanori Kadotani, Anjo, all of Japan

[73] Assignee: Aisin AW Co., Ltd., Japan

[21] Appl. No.: 717,199

[22] Filed: Jun. 18, 1991

[30] Foreign Application Priority Data

Jun. 19, 1990 [JP] Japan .................. 2-158619

[51] Int. Cl.⁵ ............ F16D 13/52; F16D 13/68; F16D 55/36
[52] U.S. Cl. ..................... 475/347; 188/71.5; 192/70.17; 192/70.19; 192/70.2; 475/346; 403/149; 403/372
[58] Field of Search ............... 188/71.5, 71.6, 73.35, 188/73.38; 192/70.17, 70.19, 70.2; 475/346, 347; 403/149, 372

[56] References Cited

U.S. PATENT DOCUMENTS

| 1,933,176 | 10/1933 | Jonsson | 188/71.5 |
| 3,829,162 | 8/1974 | Stimson et al. | 192/70.17 X |
| 3,915,272 | 10/1975 | Maurice | 188/71.5 X |
| 3,978,945 | 9/1976 | Gardner et al. | 403/372 X |
| 4,422,534 | 12/1983 | Oshima | 188/73.38 |
| 4,909,359 | 3/1990 | Fujinami et al. | 188/71.5 |
| 4,934,216 | 6/1990 | Sandel et al. | 475/346 X |
| 4,940,120 | 7/1990 | Schmidt et al. | 188/73.38 X |
| 5,009,290 | 4/1991 | Harada et al. | 188/71.5 |
| 5,054,596 | 10/1991 | Taureg et al. | 192/70.2 X |
| 5,069,314 | 12/1991 | Madzgalla et al. | 188/73.38 X |

FOREIGN PATENT DOCUMENTS

2-46324  2/1990  Japan .

Primary Examiner—Richard Lorence
Assistant Examiner—David E. Henn
Attorney, Agent, or Firm—Lorusso & Loud

[57] ABSTRACT

An automatic transmission for a vehicle having a planetary gear mechanism, which is accommodated in an automatic transmission case, is provided with an accordion-like leaf spring disposed in a gap for allowing interior spaces of an automatic transmission case to communicate with each other, the gap being provided in the automatic transmission case between an outer peripheral surface of axially movable brake elements which are fixed against rotation on the one hand, and an inner peripheral surface of the automatic transmission case on the other. The accordion-like leaf spring is adapted to engage and bias a friction plate and has folded-back portions or pleats that lie generally parallel to the rotating shaft.

2 Claims, 6 Drawing Sheets

| RANGE | | CLUTCH C0 C1 C2 | BRAKE B0 B1 B2 B3 | O.W.C. F0 F1 F2 |
|---|---|---|---|---|
| P | | E × × | × × × × | f f f |
| R | | E × E | × × × E | f f f |
| N | | E × × | × × × × | f f f |
| D | 1 | E E × | × × × × | (L) f L |
| D | 2 | E E × | × × E × | (L) L f |
| D | 3 | E E E | × × E × | (L) f f |
| D | 4 | × E E | E × E × | f f f |
| S | 1 | E E × | × × × × | (L) f L |
| S | 2 | E E × | × E E × | (L)(L) f |
| S | 3 | E E E | × × E × | (L) f f |
| S | (3) | E E E | × × E × | (L) f f |
| L | 1 | E E × | × × × E | (L) f (L) |
| L | 2 | E E × | × E E × | (L)(L) f |
| L | (1) | E E × | × × × E | (L) f (L) |

Fig. 6
(PRIOR ART)

RESILIENT SUPPORT FOR FRICTION ELEMENTS OF A MULTI-DISC CLUTCH OR BRAKE OF AN AUTOMATIC TRANSMISSION

BACKGROUND OF THE INVENTION

1. Field of the Invention

The present invention relates to a member for resiliently supporting the friction plate of a brake for an automatic transmission for a vehicle.

2. Description of the Related art

Figure 3:
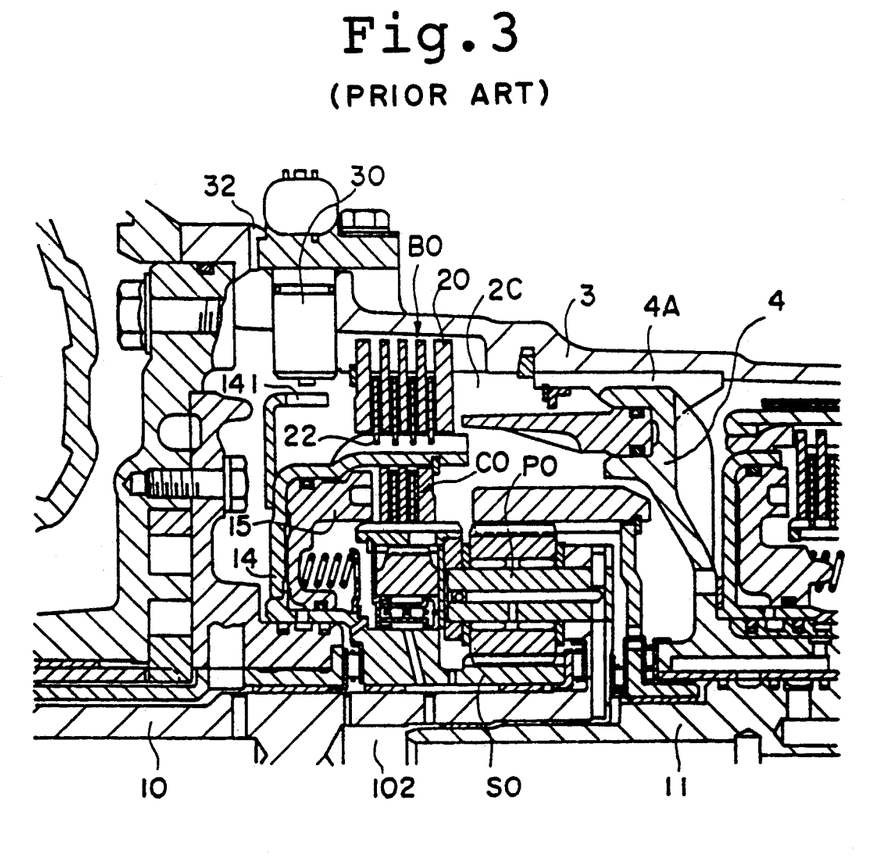
FIG. 3 is a partial enlarged view of the automatic transmission of FIG. 4.

A planetary gear mechanism includes a plurality of frictionally engaging elements. In a planetary gear mechanism, a brake causes a rotating member to frictionally engage the automatic transmission case, as required. As shown in FIG. 3, this frictional engagement is effected between a friction plate spline-engaged with a rotating member 14 and a separator plate 20 spline-engaged with an automatic transmission case 3. The automatic transmission case 3 is provided with a breather opening 32 serving to allow the space inside the case 3 to communicate with the atmospheric air. However, because one of the chambers of the automatic transmission partitioned by a brake (e.g. B0) does not communicate with the breather opening 32 and is hermetically closed, the temperature of hydraulic oil inside that case chamber can rise owing to the rotation of the rotating member. This can cause the air pressure within the case chamber to rise, thereby possibly hampering proper flow of the oil. For that reason, a gap 21 is provided between the terminus of each of a plurality of projections 20a (FIG. 1), provided on an outer peripheral portion of the separator plate 20 of the brake B0, and the bottom of each of a plurality of recesses 3a formed in the interior of the automatic transmission case 3 and into which the projections 20a of the separator plate 20 are respectively inserted. These air gaps 21 communicate with the space in the chamber of the automatic transmission case 3 partitioned axially via the brake B0 and further communicate with the atmospheric air via the breather opening 32.

In addition, if the gaps 21 are present, the friction plate 22 rotates due to the rotation of the rotating member 14, which in turn causes the separator plate 20 to move due to frictional contact with the friction plate 22. Hence, the separator plate 20 strikes the automatic transmission case 3, resulting in interference noise between the case 3 and the separator plate 20. To suppress this interference noise, a leaf spring is usually attached to the wall surface of the case 3 in each gap 21 in such a manner that the longitudinal direction of the leaf spring is aligned with the longitudinal direction of the gap 21 (refer to Japanese Patent Application Laid-Open No. 46324/1990).

However, as for the space inside the transmission case 3 partitioned into two chambers 2E, 2C by the rotating member 14 and the brake B0, if there is a large difference in capacity between the space 2E provided with the breather opening 32 and the space constituted by a transmission mechanism chamber 2C, unless sufficient breathing is provided by the gaps 21, there is a possibility that air will be forced through oil within the case 3 due to the difference in internal pressure based on the difference in volume as between the two chambers.

Figure 6:
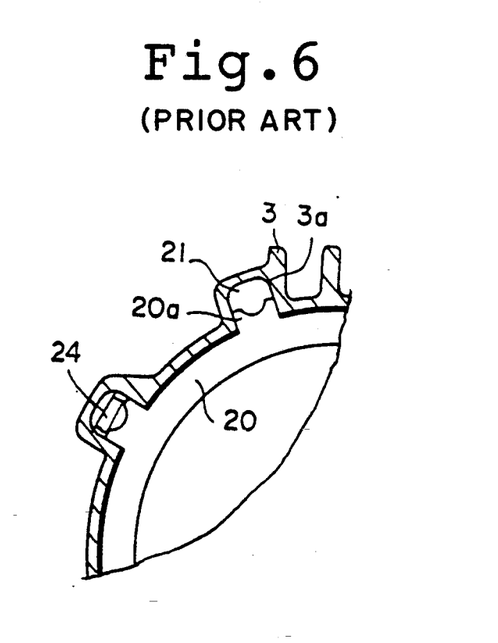
FIG. 6 is a fragmentary cross-sectional view of an automatic transmission illustrating mounting of a conventional leaf spring.

However, if the gap 21 is enlarged to increase pressure equalizing air flow between the two chambers, the leaf spring which is conventionally used for preventing clattering noise cannot serve its purpose. Accordingly, a large-sized, rigid, and resilient leaf spring becomes necessary in order to bridge the distance between the bottoms of recesses 3a on the inner peripheral surface of the automatic transmission case 3 and the tips of projections 20a on the outer peripheral surface of the separator leaf 20. In other words, the weight of a leaf spring necessary to perform its intended function becomes larger. In addition, if the size of the leaf spring, which is disposed with its longest dimension arranged parallel to the axis of the rotating shaft of the transmission, is increased, the increased size of the leaf spring blocks the aforementioned gap 21, thereby reducing the breathing capacity of the gap 21. That is, as shown in FIG. 6 which is a fragmentary cross-sectional view of the transmission, a curled portion of a leaf spring 24, which extends radially of the rotating shaft of the transmission, blocks the gap 21. It should be noted that the view of the leaf spring 24 alone which is shown in FIG. 6 is not a sectional view but an external view looking into the gap 21. Furthermore, in order to effectively accommodate such an enlarged leaf spring, the space 21 must be axially extended

SUMMARY OF THE INVENTION

Accordingly, an object of the present invention is to provide a friction plate-supporting spring which allows for increased breathing between transmission case chambers partitioned by a friction plate and which sufficiently supports the friction plate without an increase in its weight while bridging an enlarged gap between the bottoms of the recesses in the inner peripheral surface of the automatic transmission case and tips of the protrusions on the outer peripheral surface of the friction plate, thereby overcoming the above-described drawbacks of the conventional art.

To this end, in accordance with the present invention, there is provided an automatic transmission for a vehicle having a planetary gear mechanism which is accommodated in an automatic transmission case and which changes between a plurality of speed stages by selectively fixing, coupling and/or releasing a plurality of its component elements via a brake and/or a clutch. An accordion-like leaf spring is disposed in the gaps within the case recesses which receive the friction plate protrusions and allow the divided chambers within the case to communicate with each other. The accordion-like leaf spring resiliently bears against a protrusion of a friction plate and is formed with pleats, i.e. the body of the spring is folded back and forth a plurality of times to form pleats lying in positions generally concentric with the rotating shaft.

The accordion-like leaf spring, having pleats that are folded back a plurality of times to lie concentric with the rotating shaft, provides for a sufficient breathing space parallel to the rotating shaft between its pleats or folds. Accordingly, it is possible to secure sufficient breathing capacity between the transmission case chamber partitioned by the friction plate Moreover, since the configuration of the leaf spring is accordion-like, even if the gap within the case recess is significantly larger than is conventional the friction plate can be effectively resiliently supported without increasing the weight of the spring or increasing its length parallel to the axis of the rotating shaft of the automatic transmission.

The above and other objects, features and advantages of the invention will become more apparent from the following detailed description of the invention when read in conjunction with the accompanying drawings.

DESCRIPTION OF THE PREFERRED EMBODIMENT

Referring now to the accompanying drawings, an embodiment of the present invention will be described.

Figure 4:
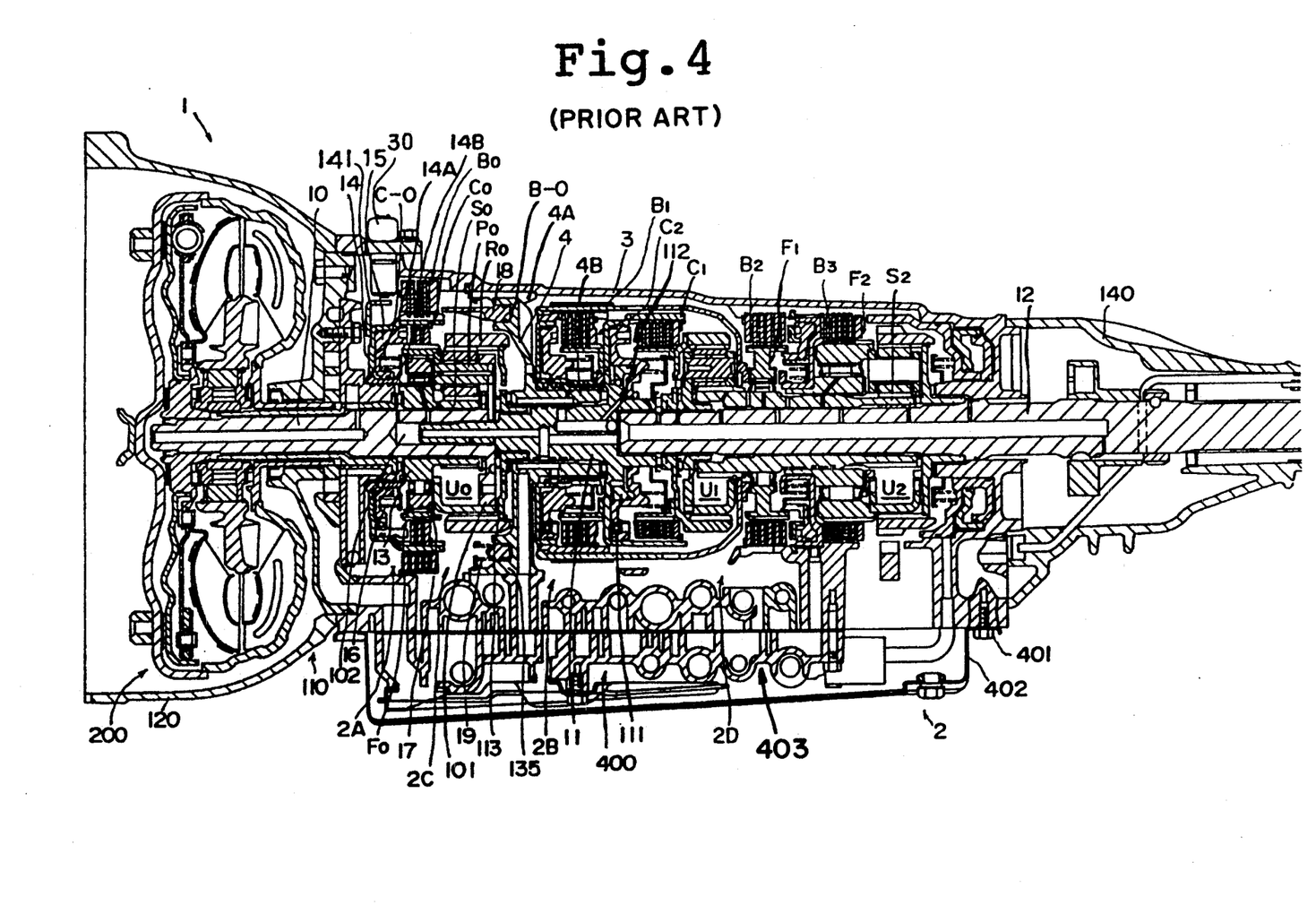
FIG. 4 is an axial cross-sectional view of a conventional automatic transmission may be modified in accordance with the present invention.

FIG. 3 shows a partial structural diagram of an automatic transmission to which the present invention is applied, and FIG. 4 shows the overall structure of that automatic transmission.

An automatic transmission 1 includes a fluid-type torque converter 200, a transmission mechanism 2, and a hydraulic controller 400.

The transmission mechanism 2 includes a first transmission mechanism 2A including a first planetary gear unit U0, a multiple-disk clutch C0 actuated by a hydraulic servo, and a one-way clutch F0, and a second transmission mechanism 2B including a second planetary gear unit U1, a third planetary gear unit U2, two multiple-disk clutches C1, C2 actuated by hydraulic servos, a belt brake B1, two multiple-disk brakes B2, B3, and two one-way clutches F1, F2

The transmission case 110 of the automatic transmission 1 includes a torque converter housing 120 for accommodating the torque converter 200; a transmission case 3 including a chamber 2C, 2D for respectively accommodating the first transmission mechanism 2A, i.e. an overdrive transmission unit, and the second transmission mechanism 2B, i.e. an underdrive transmission unit; and an extension housing 140 attached to the rear end of the automatic transmission I. The torque converter housing 120, the transmission case 3, and the extension housing 140 are secured together by means of a multiplicity of bolts.

In addition, provided in an intermediate portion of the transmission case 3 is a partition wall 4 which is provided with a rearwardly projecting cylindrical support 4B and which partitions the interior of the transmission case 3 into a first transmission mechanism chamber 2C in which the first transmission mechanism 2A is housed and a second transmission mechanism chamber 2D in which the second transmission mechanism 2B is formed. The partition wall 4 has a communication port 4A formed in an upper portion of its outer periphery which provides communication between first chamber 2C and the second chamber 2D. Since the internal air circulates through the communication port 4A, the air pressure within the first chamber 2C and the air pressure within the second chamber 2D are equalized.

The input shaft 10 of the transmission mechanism 2, which is the output shaft of the torque converter 200, has a flange 101 at one end and an axial bore 102 extending inwardly from that one end. Fitted rotatably within axial bore 102 is an intermediate transmission shaft 11 arranged in series with the input shaft 10. The intermediate transmission shaft 11 is arranged such that its tip slidably contacts the inner wall surface of the bore 102 of the input shaft 10. A flange 111 is provided at the opposite end of the intermediate transmission shaft 11, and an axial bore 112, which extends inwardly from that opposite end, receives the tip of an output shaft 12 for transmitting the power to the driving wheel side.

One end of the output shaft 12 is rotatably supported by the extension housing 140, and its opposite end is rotatably supported in the bore 112 provided in the intermediate transmission shaft 11.

The first mechanism 2A includes a first planetary gear unit U0 provided of an end portion of the input shaft 10, a ring gear R0 which is coupled with the intermediate transmission shaft 11 via a flange plate 113, a planetary carrier P0 which is coupled with the flange 101 of the input shaft 10, and a sun gear S0 which is formed as an inner race shaft 13 of the one-way clutch F0. At the front side of the first planetary gear unit U0, is a rearwardly open first hydraulic servo drum 14 secured to the inner race shaft 13, and an annular piston 15 is fitted between an outer peripheral wall 14A and inner peripheral wall 14B of the first hydraulic servo drum 14, thereby forming a hydraulic servo C-0 for the clutch C0 for engagement and disengagement between the carrier P0 and the first hydraulic servo drum 14. Also, a return spring 16 for pressing the annular piston 15 against the hydraulic servo C-0 is mounted on the inner wall 14B, and the clutch C0 is fitted to the inner side of the outer peripheral wall 14A. The first hydraulic servo drum 14 on the one hand, and the inner race shaft 13 and the carrier P0 on the other, are coupled with each other via the clutch C0. Provided on the inner periphery of the first hydraulic servo drum 14 is the one-way clutch F0 whose inner race is constituted by the inner race shaft 13. Provided on the outer periphery of the first hydraulic servo drum 14 between the outer race 17 and the transmission case 3 are the friction plates and the separator plates of the clutch C0 as well as the friction plates and the separator plates of the brake B0. A piston 18 for pressing the friction plates and the separator plates of the brake B0 is fitted in the partition wall 4 between the partition wall 4 and the brake B0. The hydraulic servo B0 for the brake B-0 is formed between the piston 18 and the partition wall 4. A return spring 19 for pressing the piston 18 against the hydraulic servo B0 side is fitted in an inner peripheral portion 135 of the front tip of the partition wall 4. In addition, the piston 18 has an unillustrated notch, and this notch allows for communication radially across the piston 18.

As best seen in FIG. 3, a breather opening 32 is provided in the transmission case 3 in the vicinity of the position where a revolution sensor 30 is attached.

The transmission mechanism 2 is arranged as follows: the engagement and disengagement of the clutches and brakes is effected by means of hydraulic pressure selectively output from the hydraulic controller 400 to the hydraulic servo of each frictionally engaging device in response to the running conditions of the vehicle such as the vehicle speed and the throttle opening. The hydraulic controller 400 is located in a valve body 403 incorporated in an oil pan 402 tightened to the underside of the transmission case 3 by means of bolts 401. The transmission mechanism 2 effects forward 4-stage speed change and reverse 1-stage speed change. An example of the operation of the clutches, brakes, and one-way clutches in accordance with various speed stages is shown in FIG. 5.

Figure 5:
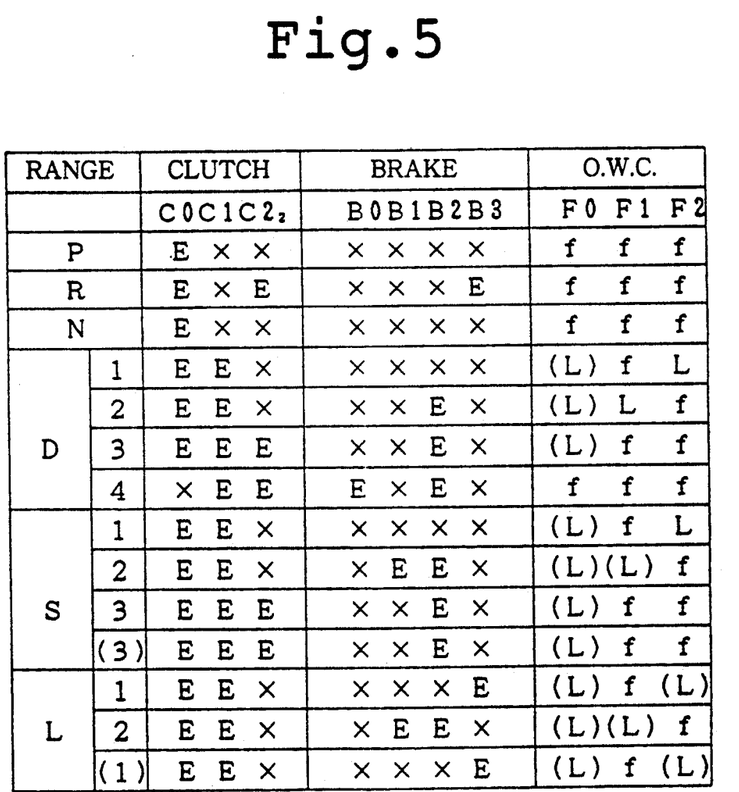
FIG. 5 is a diagram illustrating the operation of the automatic transmission of FIG. 4.

In FIG. 5, E indicates that the clutch or brake is engaged, and X indicates that the clutch or brake is released. L indicates that the one-way clutch is engaged, but its engagement is not necessarily required (i.e. it is in a locked state) since the transmission of power is ensured by a clutch or brake incorporated in parallel therewith. (L) indicates that the one-way clutch is engaged only in the state of engine drive, and that it is not engaged in the stage of engine brake. Furthermore, f indicates that the one-way clutch is free.

Figure 1:
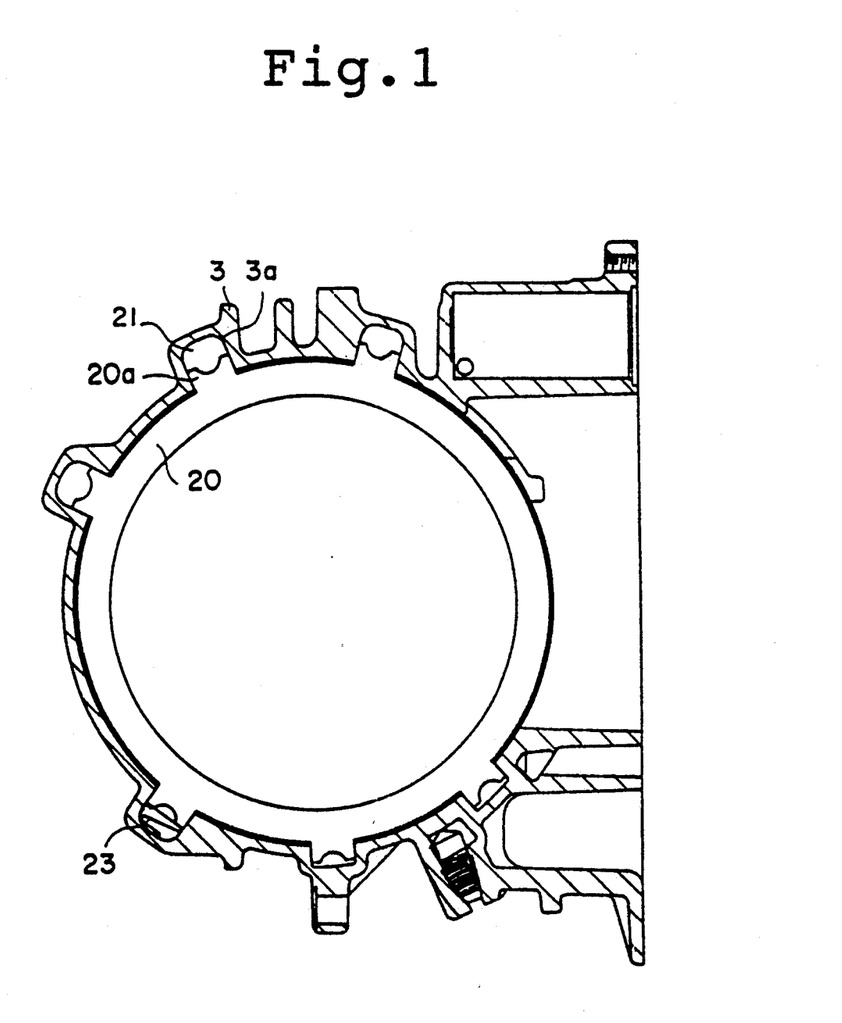
FIG. 1 is a cross-sectional view illustrating an embodiment of the present invention showing an accordion-like leaf spring mounted in place in an automatic transmission case.

FIG. 1 shows a cross-sectional view of the transmission and shows the separator plate of the brake B0 in conjunction with structure characteristic of the present invention. Projections 20a of a separator plate 20 are received in recesses 3a spaced around the circumference of the transmission case 3, while a gap 21 is formed between the bottom surface of the recess 3a of the transmission case 3 and the tip of the projection 20a of the separator plate 20. These gaps 21 serve as breathing holes allowing for communication between the chambers 2E, 2C formed within the interior space of the transmission case 3 and separated by the separator plate 20. The drum 14 to which a friction plate 22 (FIG. 3) is splined-fitted is direct-coupled with the sun gear S0, and when the drum 14 is secured to the brake B0, an overdrive is attained.

In addition, a flange 141 for detecting the number of revolutions of the input shaft is connected to the drum 14, and the revolution sensor 30 is disposed on the transmission case 3 at a position opposing the outer periphery of the flange 141.

The interior of the transmission case 3 is partitioned by the drum 14 and the brake B0 into a small space 2E provided with the breather opening 32 and a larger space constituted by transmission mechanism chambers 2C, 2D. It is necessary to enlarge the gaps 21 in light of the difference in volumes between these two spaces and a difference in the magnitude of the internal pressure based on the differences in the volumes.

An accordion-like leaf spring 23 is disposed in each of these gaps 21 in such a manner that breathing spaces are defined between the folded-back portions (pleats) of the leaf spring. These spaces extend parallel to the axis of the rotating shaft of the transmission. The accordion-like leaf spring 23 biases the separator plate 20 radially inward, i.e. toward the axis of the rotating shaft.

Figure 2A:
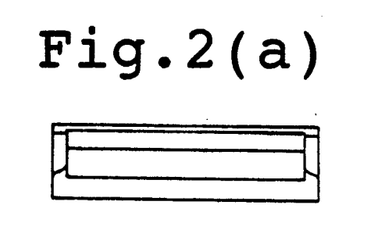
FIG. 2(a) is a top plan view of the accordion leaf spring of the present invention.
Figure 2B:
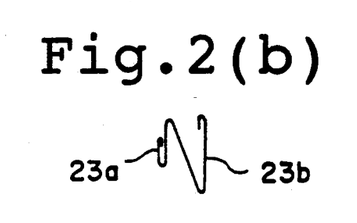
FIG. 2(b) is a cross-sectional view of the accordion leaf spring of FIG. 2(a)
Figure 2C:
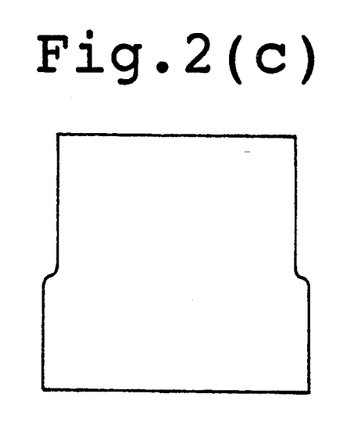
FIG. 2(c) is a plan view of a blank from which the accordion leaf spring of FIGS. 2(a) and 2(b) is fabricated.

Detailed drawings of the accordion-like leaf spring 23 are shown in FIGS. 2(a) to 2(c).

A plate whose development is shown in FIG. 2(c) is fabricated into a configuration having a section shown in FIG. 2(b). A top plan view of the fabricated accordion-like leaf spring 23 of FIG. 2(b) is shown in FIG. 2(a). The accordion-like leaf spring 23 is arranged such that a smaller portion 23a thereof abuts against the transmission case 3 and a larger diameter portion 23b abuts against the separator plate 20. Accordingly, as shown in FIG. 1, the radius of the rounded corners at the bottom of each recess 3a of the transmission case 3 abutting against the small-diameter portion 23a of the accordion-like leaf spring 23 can be made large. In addition, since the separator plate 20 abuts against the larger portion 23b of the accordion-like leaf spring 23, the separator plate 20 can be effectively engaged and biased.

In a case where the separator plate 20 having a large radius is used, a large-sized leaf spring needs to be used as the accordion-like leaf spring 23. However, the accordion-like leaf spring 23, having a plurality of folds or pleats generally parallel to rotating shaft of the transmission, provides a sufficient breathing space in the form of passages extending between the pleats or folds, parallel to the axis of the rotating shaft. Hence, it is possible to secure adequate breathing between the transmission case chambers partitioned by the friction plate. Moreover, the accordion-like leaf spring 23 offers the advantage that it can be fabricated relatively easily.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An automatic transmission for a vehicle comprising:
   a casing having a plurality of circumferentially spaced recesses, each recess extending radially outward to a closed bottom;
   a planetary gear mechanism, accommodated within said casing and mounted on a rotary shaft, for selectively establishing a plurality of speed stages by selectively fixing, coupling and releasing a plurality of its elements via brakes and clutches, at least one of said brakes and clutches including a plurality of frictionally engageable plates, each plate having plurality protrusions extending from its periphery, said protrusions having tip ends respectively received within said recesses to define breathing spaces between the tip ends and the bottoms of said recesses;
   an accordion leak spring disposed in at least one of said breathing spaces, said accordion leaf spring resiliently supporting at least one of said friction plates and having plural folded portions that are generally parallel to said rotary shaft.

2. The automatic transmission of claim 1 wherein said plural folded portions include a radially innermost fold and a radially outermost fold, said radially innermost fold contacting said one friction plate and being substantially longer in its dimension parallel to said rotary shaft than said radially outermost fold contacting the bottom of said recess.

* * * * *

UNITED STATES PATENT AND TRADEMARK OFFICE
CERTIFICATE OF CORRECTION

PATENT NO. : 5,158,508

DATED : October 27, 1992

INVENTOR(S) : SAKAGUCHI et al.

It is certified that error appears in the above-identified patent and that said Letters Patent is hereby corrected as shown below:

Col. 2, line 60, after "plate" insert a period --.--;

line 63, after "conventional" insert a comma --,--.

Col. 6, line 47, delete "plurality" and insert --plural--;

line 52, delete "leak" and insert --leaf--.

Signed and Sealed this

Fourth Day of January, 1994

Attest:

BRUCE LEHMAN

*Attesting Officer*  *Commissioner of Patents and Trademarks*